(12) United States Patent
Harada et al.

(10) Patent No.: US 10,991,515 B2
(45) Date of Patent: Apr. 27, 2021

(54) SOLID ELECTROLYTIC CAPACITOR

(71) Applicant: Murata Manufacturing Co., Ltd., Nagaokakyo (JP)

(72) Inventors: Hiroyuki Harada, Nagaokakyo (JP); Toshio Tsutsumi, Nagaokakyo (JP); Masahiro Matsuo, Nagaokakyo (JP); Kazumasa Fujimoto, Nagaokakyo (JP); Sachiko Shirakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 102 days.

(21) Appl. No.: 16/384,028

(22) Filed: Apr. 15, 2019

(65) Prior Publication Data
US 2019/0244765 A1 Aug. 8, 2019

Related U.S. Application Data

(63) Continuation of application No. PCT/JP2017/037334, filed on Oct. 16, 2017.

(30) Foreign Application Priority Data

Oct. 17, 2016 (JP) .............................. JP2016-203682

(51) Int. Cl.
*H01G 9/055* (2006.01)
*H01G 9/15* (2006.01)
(Continued)

(52) U.S. Cl.
CPC ............ *H01G 9/055* (2013.01); *H01G 9/012* (2013.01); *H01G 9/045* (2013.01); *H01G 9/07* (2013.01);
(Continued)

(58) Field of Classification Search
CPC ....................................................... H01G 9/15
See application file for complete search history.

(56) References Cited

U.S. PATENT DOCUMENTS 6,310,765 B1 10/2001 Tanahashi
6,473,293 B2 * 10/2002 Shimada ................ H01G 11/48
361/523
(Continued)

FOREIGN PATENT DOCUMENTS

JP H11219861 A 8/1999
JP 2002050545 A 2/2002
(Continued)

OTHER PUBLICATIONS

International Search Report issued for PCT/JP2017/037334, dated Jan. 9, 2018.
(Continued)

*Primary Examiner* — Eric W Thomas
(74) *Attorney, Agent, or Firm* — Arent Fox LLP

(57) ABSTRACT

A solid electrolytic capacitor that includes a plurality of laminated units each including a valve action metal substrate including a porous layer on a surface thereof, a dielectric layer on a surface of the porous layer, and a solid electrolyte layer on the dielectric layer. A metal foil is between the laminated units. The units and the conductor layers are sealed with a coating resin. The valve action metal substrate has an anode section-side end surface directly connected to an anode outer electrode on the surface of the coating resin, and the metal foil is directly connected to a cathode outer electrode on the surface of the coating resin.

12 Claims, 5 Drawing Sheets

(51) Int. Cl.
*H01G 9/045* (2006.01)
*H01G 9/012* (2006.01)
*H01G 9/07* (2006.01)
*H01G 9/00* (2006.01)

(52) U.S. Cl.
CPC ............ *H01G 9/15* (2013.01); *H01G 9/0032* (2013.01); *H01G 9/0036* (2013.01)

(56) References Cited

U.S. PATENT DOCUMENTS

| | | | | |
|---|---|---|---|---|
| 2002/0001169 A1* | 1/2002 | Shiraishi | ................ | H01G 9/012 |
| | | | | 361/523 |
| 2003/0026064 A1* | 2/2003 | Nakada | .................. | H01G 9/042 |
| | | | | 361/523 |
| 2013/0010404 A1* | 1/2013 | Chiu | ........................ | H01G 9/10 |
| | | | | 361/526 |

FOREIGN PATENT DOCUMENTS

| | | | |
|---|---|---|---|
| JP | 2008135427 | A | 6/2008 |
| JP | 2009200370 | A | 9/2009 |
| JP | 2010199350 | A | 9/2010 |

OTHER PUBLICATIONS

Written Opinion of the International Searching Authority issued for PCT/JP2017/037334, dated Jan. 9, 2018.

* cited by examiner

SECTIONAL VIEW ALONG LINE A-A

SOLID ELECTROLYTIC CAPACITOR

CROSS REFERENCE TO RELATED APPLICATIONS

The present application is a continuation of International application No. PCT/JP2017/037334, filed Oct. 16, 2017, which claims priority to Japanese Patent Application No. 2016-203682, filed Oct. 17, 2017, the entire contents of each of which are incorporated herein by reference.

FIELD OF THE INVENTION

The present invention relates to a solid electrolytic capacitor.

BACKGROUND OF THE INVENTION

A solid electrolytic capacitor includes a capacitor element including a valve action metal substrate made of a valve action metal such as aluminum, a dielectric layer placed on a surface of the valve action metal substrate, a solid electrolyte layer placed on a surface of the dielectric layer, and a conductor layer placed on a surface of the solid electrolyte layer. In a capacitor element included in such a solid electrolytic capacitor, the valve action metal substrate is made porous or roughened by etching so as to have increased surface area or a dielectric layer is formed using an oxide film, thereby enabling a compact, high-capacitance capacitor to be obtained.

A method for manufacturing this type of conventional solid electrolytic capacitor is described in Patent Document 1. The method includes a step of preparing capacitor elements provided with a cathode electrode section formed in such a manner that an anode electrode section and a cathode-forming section are isolated by providing an insulating section at a predetermined position in an anode body made of valve action metal foil having a dielectric oxide coat layer formed on a surface thereof and a solid electrolyte layer made of a conductive polymer and a cathode layer composed of a carbon layer and a silver paste layer are stacked in series on the cathode-forming section, a step of stacking a plurality of the capacitor elements on a anode COM terminal and a cathode COM terminal and joining the capacitor elements thereto, a step of providing a plurality of the capacitor elements joined to the anode COM terminal and the cathode COM terminal in a molding die and integrally coating the capacitor elements joined to the anode COM terminal and the cathode COM terminal with an insulating coating resin except portions of the anode and cathode COM terminals, and a step of providing an anode terminal section and a cathode terminal section on a lower surface serving as a mounting surface by bending the portions of the anode and cathode COM terminals that are exposed from the coating resin along the coating resin.

In the method for manufacturing the solid electrolytic capacitor, a multilayer body has been prepared in such a manner that a plurality of the capacitor elements are laminated using a conductive adhesive.

In the above-mentioned conventional solid electrolytic capacitor, the anode electrode section has been joined to an outer electrode (anode COM terminal) by a means such as resistance welding and the cathode electrode section has been joined to an outer electrode (cathode COM terminal) using an conductive adhesive or the like.

Patent Document 1: Japanese Unexamined Patent Application Publication No. 2008-135427

SUMMARY OF THE INVENTION

In the structure of the conventional solid electrolytic capacitor, three layers, that is, the solid electrolyte layer, the carbon layer, and the silver paste layer have been laminated for the purpose of forming the cathode layer and the conductive adhesive is used to laminate the capacitor elements. A four-layer configuration containing four types of materials is necessary in this structure and therefore the simplification of this structure has been desired. In the above model, the cathode electrode section is joined to an outer electrode with a conductive adhesive layer interposed therebetween and therefore there has been a problem in that the equivalent series resistance (ESR) is high.

The present invention has been made to solve the above problem and has an object to provide a solid electrolytic capacitor which has a simple structure and which can reduce the ESR.

A solid electrolytic capacitor according to the present invention includes a plurality of laminated units each including a valve action metal substrate including a porous layer on a surface thereof, a dielectric layer on a surface of the porous layer, and a solid electrolyte layer on the dielectric layer. At least a metal foil is present between the laminated units. The units and the conductor layers are sealed with a coating resin. The valve action metal substrate has an anode section-side end surface directly connected to an anode outer electrode on the surface of the coating resin. The metal foil is directly connected to a cathode outer electrode on the surface of the coating resin.

In the solid electrolytic capacitor according to the present invention, it is preferable that a carbon layer is on the solid electrolyte layer and the metal foil not surface-coated with carbon and the metal foil is in direct contact with the carbon layer. It is further preferable that a carbon layer is placed on the solid electrolyte layer and the metal foil have a surface coated with carbon and the carbon-coated surface of the metal foil is in direct contact with the carbon layer. The contact resistance between the metal foil and the carbon layer is preferably less than the contact resistance between the carbon layer and the solid electrolyte layer. The contact resistance between the metal foil and the carbon layer is preferably 5 mΩ to 351 mΩ.

In the solid electrolytic capacitor according to the present invention, a carbon layer is preferably placed on the solid electrolyte layer, a silver layer is preferably placed on the carbon layer, and the metal foil is placed on the silver layer.

In the solid electrolytic capacitor according to the present invention, it is preferable that the metal foil is in direct contact with the solid electrolyte layer. In the solid electrolytic capacitor according to the present invention, it is preferable that the metal foil have a surface coated with carbon and the carbon-coated surface of the metal foil is in direct contact with the solid electrolyte layer.

In the solid electrolytic capacitor according to the present invention, a conductive adhesive layer is preferably placed on the solid electrolyte layer and metal foil is placed on the conductive adhesive layer.

In the solid electrolytic capacitor according to the present invention, a carbon layer is preferably placed on the solid electrolyte layer, a conductive adhesive layer is preferably placed on the carbon layer, and the metal foil is placed on the conductive adhesive layer.

In the solid electrolytic capacitor according to the present invention, two or more of the conductor layers present between the laminated units preferably include the metal foil. In the solid electrolytic capacitor according to the present invention, all of the conductor layers present between the laminated units preferably include the metal foil.

In the solid electrolytic capacitor according to the present invention, a surface of the metal foil is preferably provided with a roughened surface. In the solid electrolytic capacitor according to the present invention, a surface of the metal foil is preferably provided with a coat layer made of an anchor coat agent. The surface roughness Ra of the metal foil is preferably 30 nm to 1,002 nm.

In the solid electrolytic capacitor according to the present invention, the thickness of the metal foil is preferably 6 μm to 100 μm. The through-thickness resistance of the metal foil is preferably 5 mΩ to 34 mΩ. The metal foil is preferably made of at least one metal selected from the group consisting of aluminum, copper, and silver. The metal foil is also preferably provided with at least one through-hole.

In the solid electrolytic capacitor according to the present invention, an insulating layer is preferably provided so as to surround the valve action metal substrate so as to isolate an anode section and a cathode section of the valve action metal substrate.

In the solid electrolytic capacitor according to the present invention, it is preferable that the metal foil is not present on the uppermost surface or lowermost surface of a multilayer body formed by laminating a plurality of the units.

In a solid electrolytic capacitor according to the present invention, the metal foil is preferably directly connected to an outer electrode (cathode outer electrode) on the surface of a coating resin. Furthermore, an anode section-side end surface of a valve action metal substrate is directly connected to an outer electrode (anode outer electrode) on the surface of the coating resin.

A cathode section and an anode section can be directly connected to the outer electrodes as described above and therefore need not be joined to the outer electrodes using COM terminals or the like.

Since it is not essential that the conductor layers have a four-layer configuration, an inexpensive solid electrolytic capacitor with a simple structure can be provided. The ESR can be reduced by directly connecting metal foil to the outer electrodes.

Figure 2A:
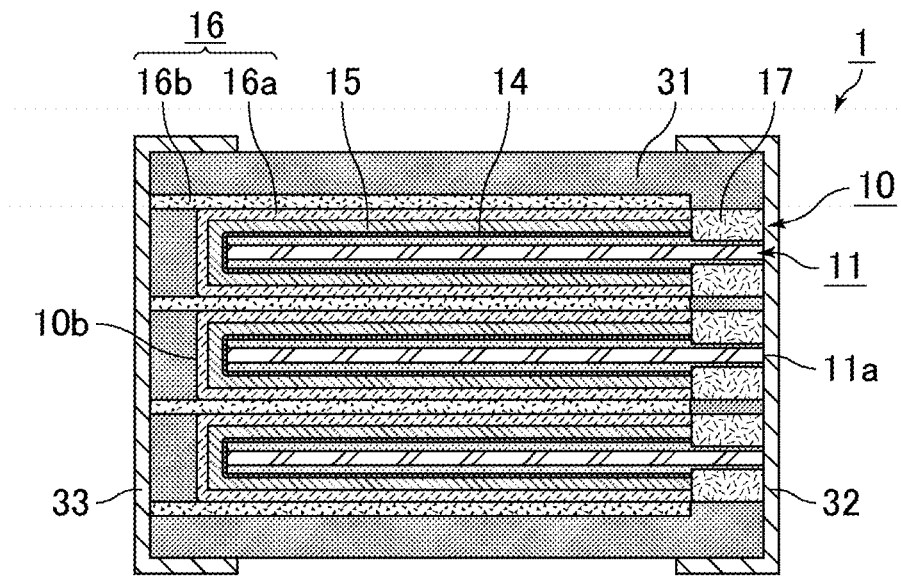
Figure 2B:
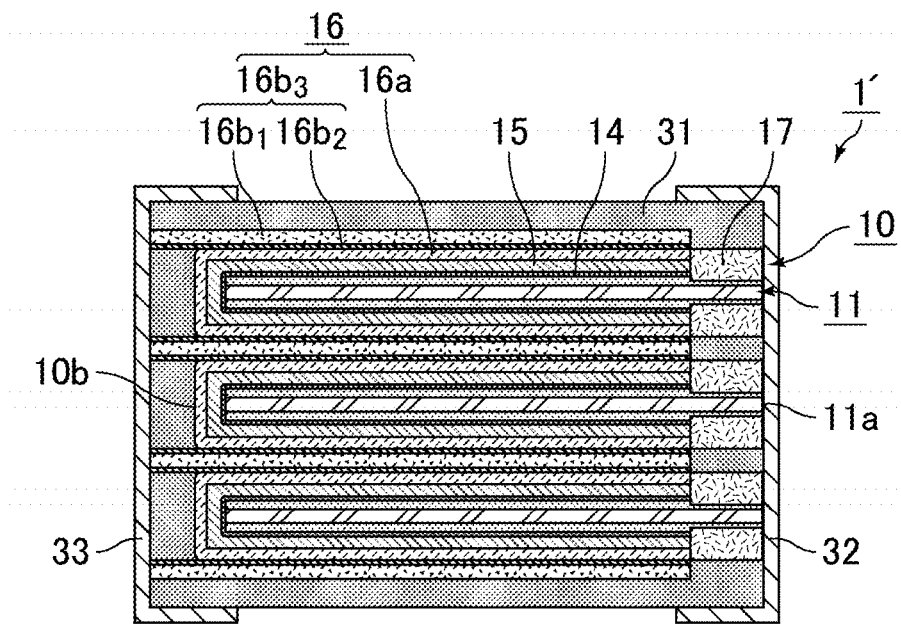

Each of FIGS. 2(a) and 2(b) is a schematic sectional view of an example of the solid electrolytic capacitor according to the present invention.

Figure 3:
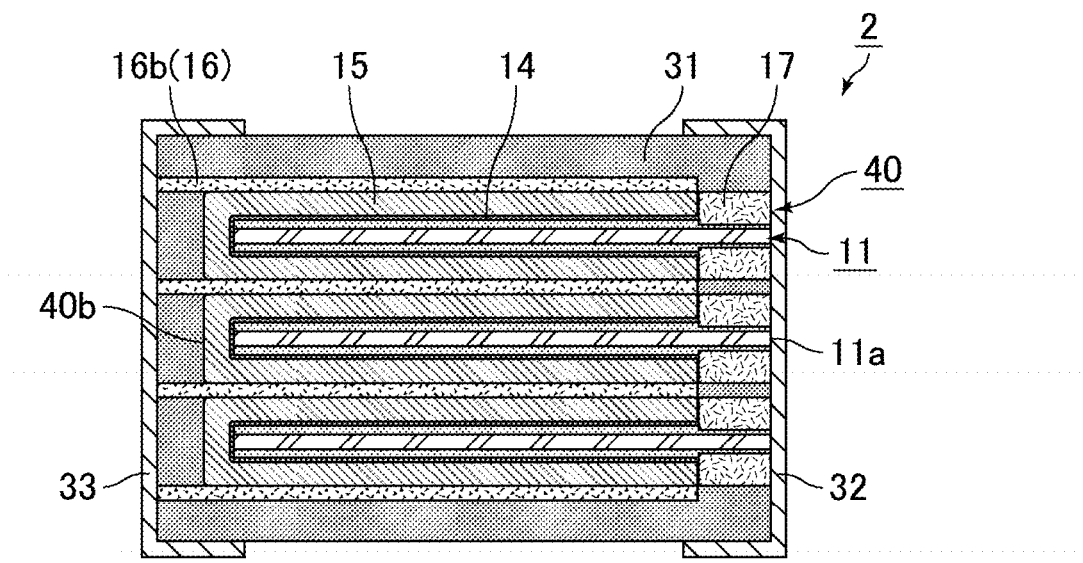

FIG. 3 is a schematic sectional view of another example of the solid electrolytic capacitor according to the present invention.

Figure 4A:
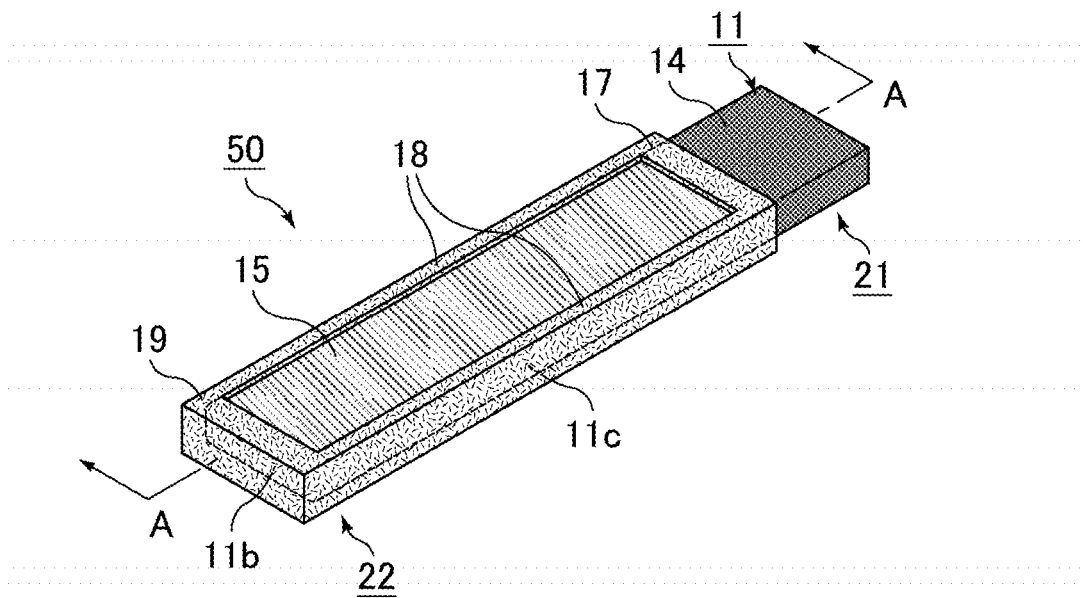
Figure 4B:
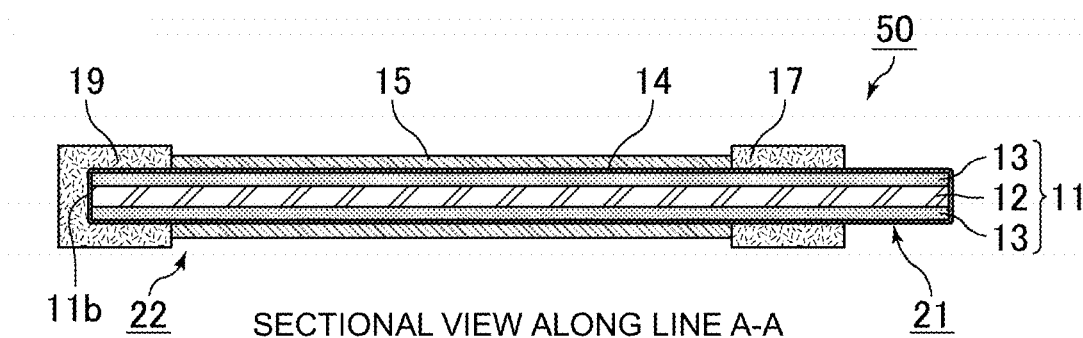

FIG. 4(a) is a schematic perspective view of an example of a unit with a structure in which a region provided with a solid electrolyte layer is surrounded by an insulating material on a principal surface of a valve action metal substrate and FIG. 4(b) is a sectional view taken along the line A-A of FIG. 4(a).

FIGS. 5(a), 5(b), 5(c), and 5(d) are sectional views schematically showing steps of a method for manufacturing a solid electrolytic capacitor.

Figure 6:
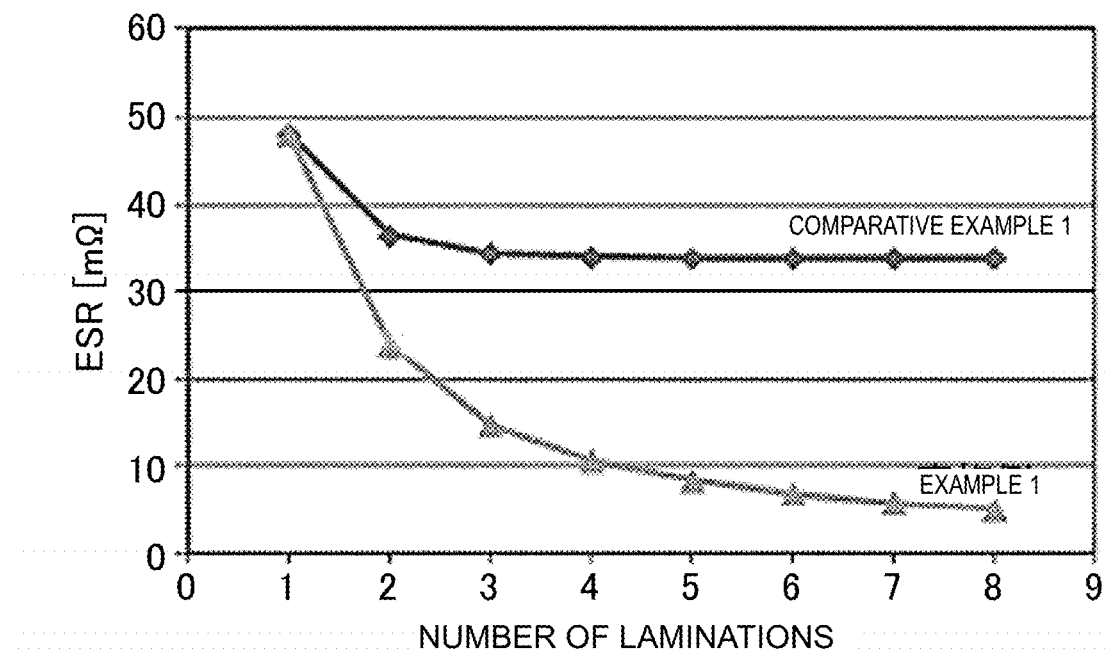

FIG. 6 is a graph showing the relationship between the number of laminated units or solid electrolytic capacitor elements in each of the solid electrolytic capacitors according to Example 1 and Comparative Example 1 and the ESR.

Figure 7:
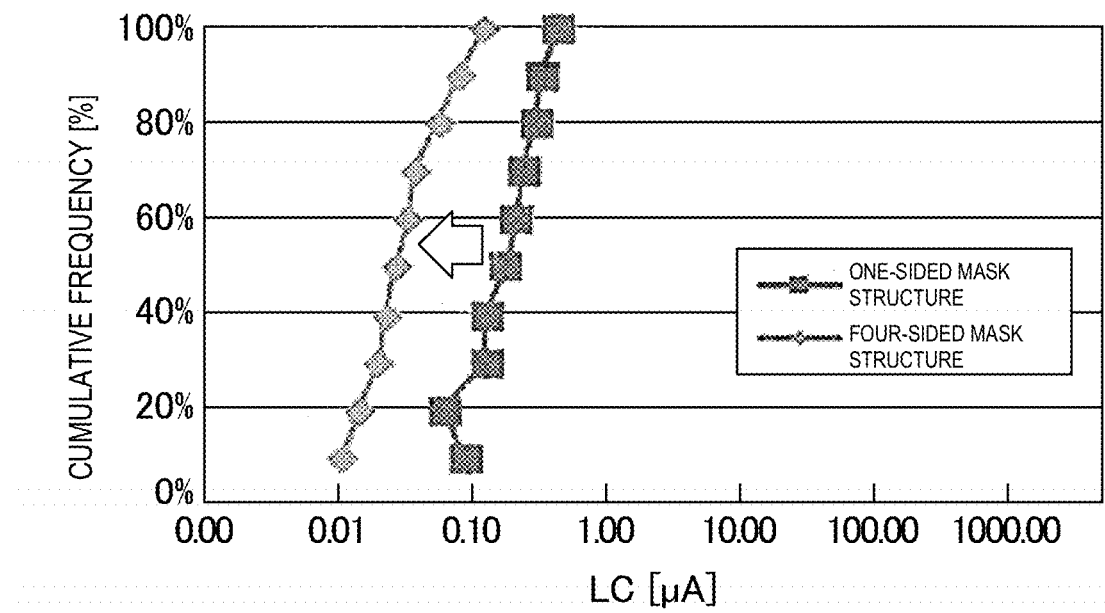

FIG. 7 is a graph showing measurement results of the leakage current of the solid electrolytic capacitor with a four-sided mask structure.

DETAILED DESCRIPTION OF THE PREFERRED EMBODIMENTS

A solid electrolytic capacitor according to the present invention is described below. However, the present invention is not limited to configurations below and appropriate modifications can be made without departing from the spirit of the present invention. Combinations of two or more individual configurations preferred in the present invention as described below are also included in the present invention.

[Solid Electrolytic Capacitor]

The solid electrolytic capacitor according to the present invention includes a plurality of laminated units each including a valve action metal substrate including a porous layer on a surface thereof, a dielectric layer placed on a surface of the porous layer, and a solid electrolyte layer placed on the dielectric layer. Conductor layers are present between the laminated units. At least one of the conductor layers includes metal foil. The units and the conductor layers are sealed with a coating resin. The valve action metal substrate has an anode section-side end surface directly connected to an anode outer electrode placed on the surface of the coating resin in an end surface of the solid electrolytic capacitor. The metal foil is directly connected to a cathode outer electrode placed on the surface of the coating resin in another end surface of the solid electrolytic capacitor.

In the solid electrolytic capacitor according to the present invention, the conductor layers are conductive layers present between the units. The conductor layers may be single layers made of a type of conductive substance or those including two or more sublayers made of multiple types of conductive substances. Layers of the conductive material may be those formed outside the solid electrolyte layers, which are included in the units, in advance before the units are laminated. Alternatively, the conductive material layers may be those which are prepared separately from the units before the units are laminated and which are provided between the units when the units are laminated.

First, one of the units, which are included in the solid electrolytic capacitor according to the present invention, is described. Thereafter, the solid electrolytic capacitor, which includes a plurality of the laminated units, according to the present invention, is described.

One of the units, which are included in the solid electrolytic capacitor according to the present invention, includes the valve action metal substrate, which includes the porous layer on a surface thereof; the dielectric layer, which is placed on a surface of the porous layer; and the solid electrolyte layer, which is placed on the dielectric layer.

Figure 1A:
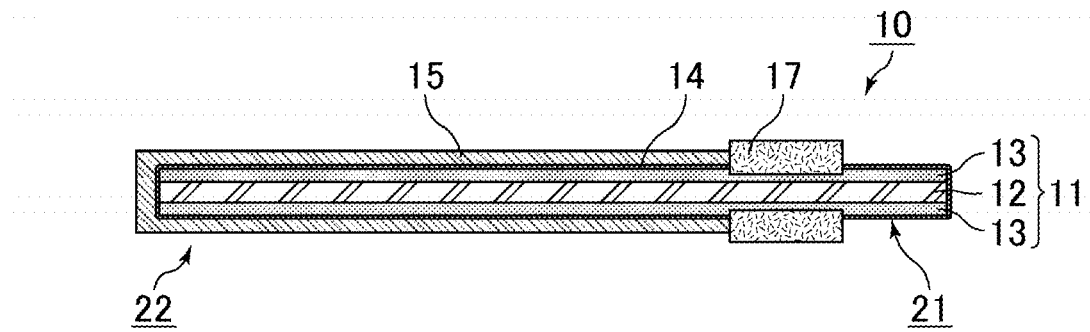
FIG. 1(a) is a schematic sectional view of an example of units included in a solid electrolytic capacitor according to the present invention.

FIG. 1(a) is a schematic sectional view of an example of the units, which are included in the solid electrolytic capacitor according to the present invention.

A unit 10 shown in FIG. 1(a) includes a valve action metal substrate 11, a dielectric layer 14, and a solid electrolyte layer 15. The valve action metal substrate 11 includes a metal core section 12 at the center thereof and porous layers 13, such as etched layers, on surfaces thereof. The dielectric layer 14 is placed over surfaces of the porous layers 13. An insulating layer 17 which serves as an insulating section and which has a predetermined width is placed on the valve action metal substrate 11 so as to surround the valve action metal substrate 11. An anode section 21 and a cathode section 22 are isolated by the insulating layer 17.

The dielectric layer 14 may be placed in at least the cathode section 22, may be placed in a portion where the insulating layer 17 is placed on the valve action metal substrate 11, or may be placed in a portion of the anode section 21. When an outer electrode is placed next to the insulating layer 17 in the preparation of the solid electrolytic capacitor as described below, the anode section 21 does not protrude from the insulating layer 17 and the valve action metal substrate 11 has an anode section-side end surface 11a (refer to FIGS. 2(a) and 2(b)) which is exposed from the insulating layer 17 and which is directly connected to the outer electrode.

In the solid electrolytic capacitor according to the present invention, the valve action metal substrate is made of a valve action metal exhibiting a so-called valve action. Examples of the valve action metal include elemental metals such as aluminum, tantalum, niobium, titanium, zirconium, magnesium, and silicon and alloys containing these metals. Among these, aluminum or an aluminum alloy is preferable for the valve action metal substrate.

The shape of the valve action metal substrate is not particularly limited and the valve action metal substrate is preferably plate-shaped and more preferably foil-shaped. The porous layers, which are placed on surfaces of the valve action metal substrate, are preferably etched layers.

In the solid electrolytic capacitor according to the present invention, the dielectric layer is preferably composed of an oxide film of the valve action metal. When the valve action metal substrate used is, for example, aluminum foil, the oxide film, which is used to form the dielectric layer, can be formed in such a manner that the aluminum foil is anodized in an aqueous solution which contains boric acid, phosphoric acid, or adipic acid or which contains a sodium salt thereof, an ammonium thereof, or the like.

In the solid electrolytic capacitor according to the present invention, in order to reliably isolate the anode section and the cathode section, the insulating layer is preferably placed. Examples of material for forming the insulating layer include polyphenylsulfone (PPS) resins, polyethersulfone (PES) resins, cyanate resins, fluorocarbon resins (tetrafluoroethylene, tetrafluoroethylene-perfluoroalkyl vinyl ether copolymers, and the like), compositions composed of soluble polyimide siloxane and epoxy resins, polyimide resins, polyamideimide resins, and insulating resins such as derivatives or precursors thereof.

In the solid electrolytic capacitor according to the present invention, examples of material for forming the solid electrolyte layer include conductive polymers based on pyrroles, thiophenes, anilines, or the like. A thiophene-based conductive polymer is, for example, PEDOT [poly(3,4-ethylenedioxythiophene)] and may be PEDOT:PSS obtained by hybridizing PEDOT with polystyrenesulfonic acid (PSS), which serves as a dopant.

Figure 1B:
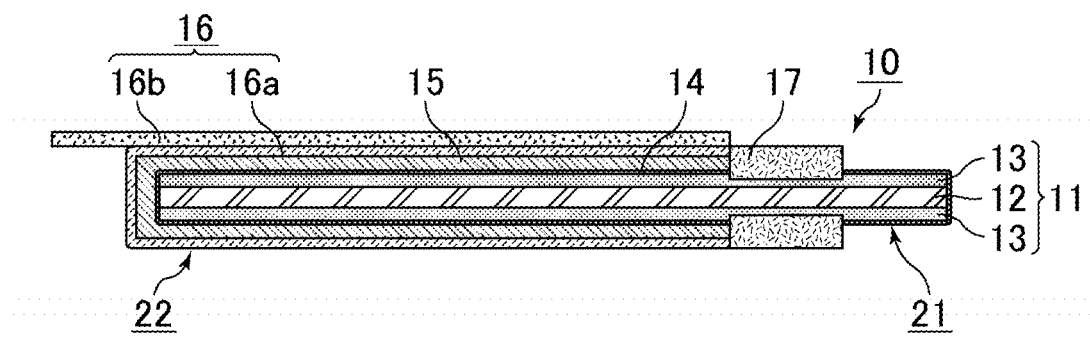
FIG. 1(b) is a sectional view schematically showing a state in which a conductor layer is placed on a solid electrolyte layer of a unit shown in FIG. 1(a)

FIG. 1(b) is a sectional view schematically showing a state in which a conductor layer is placed on the solid electrolyte layer of the unit shown in FIG. 1(a).

FIG. 1(b) shows a configuration in which the conductor layer 16 is composed of a carbon layer 16a placed on the solid electrolyte layer 15 of the unit 10 and metal foil 16b not surface-coated with carbon and the metal foil 16b is in direct contact with the carbon layer 16a.

Stacking a plurality of constitutional units in which the conductor layer 16 is attached to the unit 10 as shown in FIG. 1(b) provides the solid electrolytic capacitor according to the present invention such that a plurality of the units are laminated and the conductor layers are present between the laminated units.

Figure 1C:
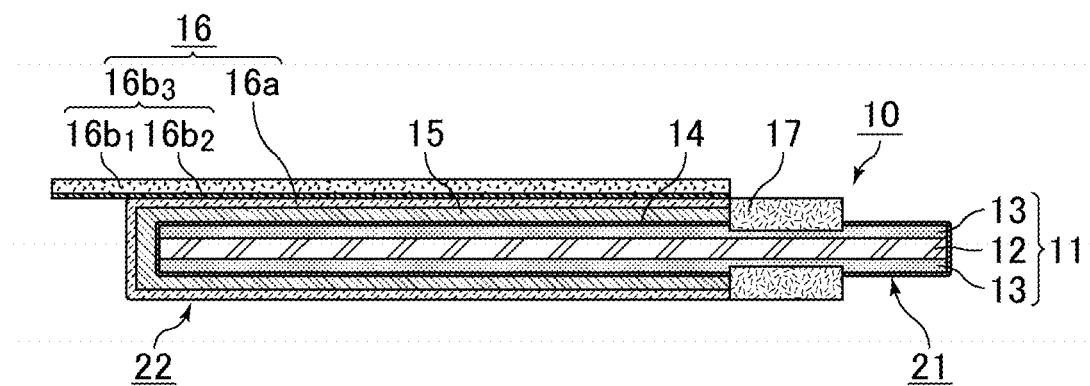
FIG. 1(c) is a sectional view schematically showing an example of a state in which a conductor layer is placed on the solid electrolyte layer of the unit shown in FIG. 1(a).

FIG. 1(c) is a sectional view schematically showing an example of a state in which a conductor layer is placed on the solid electrolyte layer of the unit shown in FIG. 1(a).

The metal foil may be a metal foil coated with carbon. In this case, it is preferable that a conductor layer including metal foil is composed of a carbon layer placed on a solid electrolyte layer and metal foil having a surface coated with carbon and the carbon-coated surface of the metal foil is in direct contact with the carbon layer.

FIG. 1(c) shows a configuration including metal foil $16b_3$, coated with carbon, including a carbon coat $16b_2$ on a surface of metal foil $16b_1$.

Referring to FIG. 1(c), the conductor layer 16 is composed of the carbon layer 16a placed on the solid electrolyte layer 15 of the unit 10 and the metal foil $16b_3$, placed on the carbon layer 16a, including the carbon coat $16b_2$ and the carbon coat $16b_2$ is in direct contact with the carbon layer 16a.

The metal foil coated with carbon is preferably metal foil having a surface coated with carbon by a vapor deposition method, a sputtering method, a CVD method, or the like. A carbon coat is preferably placed on one or both surfaces of metal foil.

Stacking a plurality of constitutional units in which the conductor layer 16 is attached to the unit 10 as shown in FIG. 1(c) provides the solid electrolytic capacitor according to the present invention such that a plurality of the units are laminated and the conductor layers are present between the laminated units.

Each of FIGS. 2(a) and 2(b) is a schematic sectional view of an example of the solid electrolytic capacitor according to the present invention.

In a solid electrolytic capacitor 1 according to the present invention shown in FIG. 2(a), a plurality of such units 10 as shown in FIG. 1 are laminated and the carbon layer 16a and the metal foil 16b are present between the laminated units 10 in the form of the conductor layer 16. While the units 10 are sealed with a coating resin 31, the anode section-side end surface 11a of the valve action metal substrate 11 is exposed from the insulating layer 17 and is directly connected to an anode outer electrode 32 placed on an end surface of the solid electrolytic capacitor 1. On the other hand, an end portion of the metal foil 16b protrudes from a cathode section-side end surface 10b of each unit 10, is exposed from the coating resin 31, and is directly connected to a cathode outer electrode 33 placed on the surface of the coating resin 31 (another end surface of the solid electrolytic capacitor 1).

Incidentally, metal foil 16b is placed on the lower side of the lowermost one of the laminated units 10.

FIG. 2(b) shows a solid electrolytic capacitor 1' configured by changing the configuration of the conductor layer 16 in the solid electrolytic capacitor 1 shown in FIG. 2(a) to one including the metal foil $16b_3$ coated with carbon as shown in FIG. 1(c). The solid electrolytic capacitor 1' shown in FIG. 2(b) has substantially the same configuration as that of the solid electrolytic capacitor 1 shown in FIG. 2(a) except that the configuration of the conductor layer 16 is different.

In the solid electrolytic capacitor according to the present invention, as well as the solid electrolytic capacitors shown in FIGS. 2(a) and 2(b), the units and the conductor layers are sealed with the coating resin and each of the anode section-side end surface and metal foil of the valve action metal substrate is directly connected to a corresponding one of outer electrodes placed on the surface of the coating resin.

Since each of the anode section-side end surface of the valve action metal substrate and the metal foil is directly connected to a corresponding one of the outer electrodes placed on the surface of the coating resin, the ESR can be reduced.

In the solid electrolytic capacitor according to the present invention, the conductor layers are present between the solid electrolyte layers, which are included in the units.

In the solid electrolytic capacitors shown in FIGS. 2(a) and 2(b), each of the conductor layers is composed of a corresponding one of the carbon layers placed on the solid electrolyte layers of the neighboring units and metal foil which is placed so as to be interposed between two of the carbon layers. There are various conceivable models for the preferable configuration of the conductor layers. The models are enumerated below.

Models shown in FIGS. 2(a) and 2(b) correspond to Model (a) below.

Metal foil in Models (a) to (d) may be metal foil coated with carbon.

(a) A conductor layer including metal foil is composed of carbon layers and the metal foil.

In this case, each of the carbon layers is placed on a corresponding one of solid electrolyte layers of neighboring units and the metal foil is present so as to be interposed between two of the carbon layers.

Since the conductor layer is composed of the carbon layers and the metal foil, a silver layer and conductive adhesive layer for use in conventional solid electrolytic capacitors can be omitted.

Therefore, an inexpensive solid electrolytic capacitor with a simpler structure can be provided.

(b) A conductor layer including metal foil is composed of carbon layers, silver layers, and the metal foil.

In this case, each of the carbon layers is placed on a corresponding one of solid electrolyte layers of neighboring units, each of the silver layers is placed on a corresponding one of the carbon layers, and the metal foil is present so as to be interposed between two of the silver layers.

Since the conductor layer is composed of the carbon layers, the silver layers, and the metal foil, a conductive adhesive layer for use in conventional solid electrolytic capacitors can be omitted. Therefore, an inexpensive solid electrolytic capacitor with a simpler structure can be provided.

(c) A conductor layer including metal foil is composed of silver layers and the metal foil.

In this case, only each of the silver layers is placed on a corresponding one of solid electrolyte layers of neighboring units and the metal foil is present so as to be interposed between two of the silver layers.

Since the conductor layer is composed of the silver layers and the metal foil, a carbon layer and conductive adhesive layer for use in conventional solid electrolytic capacitors can be omitted. Therefore, an inexpensive solid electrolytic capacitor with a simpler structure can be provided.

(d) A conductor layer including metal foil is composed of the metal foil only and the metal foil is in direct contact with solid electrolyte layers.

In this case, no carbon layers, silver layers, or conductive adhesive layers are placed on solid electrolyte layers of neighboring units and the metal foil is present so as to be interposed between two of the solid electrolyte layers.

Since the conductor layer is composed of the metal foil only, the ESR can be significantly reduced and a carbon layer, silver layer, and conductive adhesive layer for use in conventional solid electrolytic capacitors can be omitted. Therefore, an inexpensive solid electrolytic capacitor with a simpler structure can be provided.

Model (d) is described below with reference to a drawing.

FIG. 3 is a schematic sectional view of another example of the solid electrolytic capacitor according to the present invention.

A solid electrolytic capacitor 2 according to the present invention includes a plurality of laminated units 40 as shown in FIG. 3.

Each unit 40, as well as the unit 10, includes a valve action metal substrate 11, a dielectric layer 14, a solid electrolyte layer 15, and an insulating layer 17.

Only metal foil 16b as a conductor layer 16 is present between the units 40 and no carbon layers are present on both sides of the metal foil 16b. A plurality of the laminated units 40 are sealed with a coating resin 31 and an anode section-side end surface 11a of the valve action metal substrate 11 is exposed from the insulating layer 17 and is directly connected to an anode outer electrode 32 placed on an end surface of the solid electrolytic capacitor 2. On the other hand, an end portion of the metal foil 16b protrudes from a cathode section-side end surface 40b of the unit 40, is exposed from the coating resin 31, and is directly connected to a cathode outer electrode 33 placed on the surface of the coating resin 31 (another end surface of the unit 40).

As shown in FIG. 3, in the solid electrolytic capacitor 2, the anode section-side end surface 11a of the valve action metal substrate 11 and the metal foil 16b are directly connected to the anode outer electrode 32 and the cathode outer electrode 33, which are placed on both end surfaces of the solid electrolytic capacitor 2, respectively; hence, the ESR can be significantly reduced. Furthermore, a carbon layer, silver layer, and conductive adhesive layer for use in conventional solid electrolytic capacitors can be omitted. Therefore, the structure is simple and the price of the solid electrolytic capacitor can be reduced.

In the case of using metal foil only as a conductor layer, it is preferable that the metal foil is metal foil having a surface coated with carbon by a vapor deposition method, a sputtering method, a CVD method, or the like and the carbon-coated surface of the metal foil is in direct contact with a solid electrolyte layer. Using the carbon-coated surface enables characteristics similar to those in the case where a carbon layer is placed on a solid electrolyte layer to be exhibited using the metal foil only.

Models (a) to (d) are models in which a conductor layer including metal foil includes no conductive adhesive layer. A conductor layer including metal foil may include a conductive adhesive layer. For example, models below are cited.

(e) A conductor layer including metal foil is composed of conductive adhesive layers and the metal foil.

In this case, each of the conductive adhesive layers is placed on a corresponding one of solid electrolyte layers of neighboring units and the metal foil is present so as to be interposed between two of the conductive adhesive layers.

Since the conductor layer is composed of the conductive adhesive layers and the metal foil, a carbon layer and silver layer for use in conventional solid electrolytic capacitors can be omitted. Therefore, an inexpensive solid electrolytic capacitor with a simpler structure can be provided.

(f) A conductor layer including metal foil is composed of carbon layers, conductive adhesive layers, and the metal foil.

In this case, each of the carbon layers is placed on a corresponding one of solid electrolyte layers of neighboring units, each of the conductive adhesive layers is placed on a corresponding one of the carbon layers, and the metal foil is present so as to be interposed between two of the conductive adhesive layers.

Since the conductor layer is composed of the carbon layers, the conductive adhesive layers, and the metal foil, a silver layer for use in conventional solid electrolytic capacitors can be omitted. Therefore, an inexpensive solid electrolytic capacitor with a simpler structure can be provided.

In Models (a) to (f), configurations on both sides of metal foil are the same. Models below may be used.

(g) The configuration of a conductor layer on one of surfaces sandwiching metal foil is different from the configuration of a conductor layer on the other surface.

For example, the following model is cited: a model in which a carbon layer is placed on a solid electrolyte layer on a surface of metal foil and a carbon layer and a silver layer are placed on a solid electrolyte layer on another surface of the metal foil.

(h) A layer of another material making up a conductor layer is not present on one of surfaces sandwiching metal foil.

For example, the following model is cited: a model in which a carbon layer is placed on a solid electrolyte layer on a surface of metal foil and a solid electrolyte layer and the metal foil are in direct contact with each other on another surface.

In a solid electrolytic capacitor according to the present invention, at least one of conductor layers includes metal foil. The solid electrolytic capacitor according to the present invention may be provided with a conductor layer including no metal foil. Two or more of conductor layers present between laminated units preferably include metal foil.

When two or more of the conductor layers include the metal foil, a plurality of pieces of metal foil capable of being directly connected to outer electrodes are present and therefore the ESR is likely to be reduced.

In the solid electrolytic capacitor according to the present invention, all of the conductor layers present between the laminated units preferably include metal foil.

When all of the conductor layers include the metal foil, the units can be directly connected to outer electrodes with the metal foil interposed therebetween and therefore the ESR can be significantly reduced.

The contact resistance "between components of a conductor layer in contact with metal foil-metal foil" is preferably less than the contact resistance "between components of a conductor layer in contact with a solid electrolyte layer-solid electrolyte layer".

For example, in the case of "(a) a conductor layer including metal foil is composed of carbon layers and the metal foil", the contact resistance between the metal foil and the carbon layer is preferably less than the contact resistance between the carbon layer and a solid electrolyte layer.

In this case, the contact resistance "between components of a conductor layer in contact with metal foil-metal foil" does not vary significantly. Therefore, reducing the contact resistance between components of a conductor layer in contact with metal foil and metal foil results in that the ESR of a solid electrolytic capacitor can be reduced.

In Model (a), the contact resistance between the metal foil and the carbon layer is preferably 5 m$\Omega$ to 351 m$\Omega$ and more preferably 5 m$\Omega$ to 34 m$\Omega$.

When the contact resistance between the metal foil and the carbon layer is 5 m$\Omega$ to 351 m$\Omega$, the ESR can be reduced as compared to that of conventional solid electrolytic capacitors.

In a solid electrolytic capacitor according to the present invention, it is technically difficult to adjust the contact resistance between metal foil and a carbon layer to less than 5 m$\Omega$. On the other hand, when the contact resistance between the metal foil and the carbon layer is higher than 351 m$\Omega$, the value of ESR increases significantly.

A surface of metal foil is preferably provided with a roughened surface. When the metal foil surface is provided with the roughened surface, the close contact between the metal foil and another conductor layer or a solid electrolyte layer is improved and the contact resistance therebetween can be reduced, resulting in that the ESR can be reduced.

A method for forming the roughened surface is not particularly limited and the roughened surface may be formed by etching or the like. A surface of metal foil may be provided with a coat layer made of an anchor coat agent.

When the metal foil surface is provided with the coat layer, which is made of the anchor coat agent, the close contact between the metal foil and another conductor layer or a solid electrolyte layer is improved and the contact resistance therebetween can be reduced.

The surface roughness Ra of metal foil is preferably 30 nm to 1,002 nm. The surface roughness Ra of the metal foil can be measured with an AFM (atomic force microscope).

When the surface roughness Ra of the metal foil is 30 nm to 1,002 nm, the contact resistance decreases and the ESR can be reduced.

When the surface roughness Ra of the metal foil is less than 30 nm, a surface of the metal foil is too flat; hence, the close contact between the metal foil and another layer is weak and the contact resistance between the metal foil and the other layer is large. However, when the surface roughness Ra of the metal foil is larger than 1,002 nm, the surface roughness Ra of the metal foil is too large and the contact resistance between the metal foil and another layer is large.

The thickness of metal foil is preferably 6 $\mu$m to 100 $\mu$m. When the thickness of metal foil is 6 $\mu$m to 100 $\mu$m, the ESR can be reduced. When the thickness of metal foil is less than 6 $\mu$m, the resistance increases and the ESR is large. However, when the thickness of metal foil is larger than 100 $\mu$m, the thickness of a solid electrolytic capacitor is large, which is not preferable.

The through-thickness resistance of metal foil is preferably 5 m$\Omega$ to 34 m$\Omega$. When the resistance of the metal foil is 5 m$\Omega$ to 34 m$\Omega$, the ESR can be reduced. An attempt to obtain metal foil with a resistance of less than 5 m$\Omega$ leads to the excessive increase in price of metal foil, thereby causing the increase in price of a solid electrolytic capacitor. However, when the resistance of the metal foil is higher than 34 m$\Omega$, the ESR increases.

Metal foil is preferably made of at least one selected from the group consisting of aluminum, copper, silver, titanium, and alloys mainly containing these metals.

When the metal foil is made of at least one metal selected from the group consisting of aluminum, copper, and silver, the resistance of the metal foil can be reduced and the ESR can be reduced.

Alternatively, the metal foil may be foil coated with carbon as described in Model (d).

At least one piece of metal foil is preferably provided with at least one through-hole. When metal foil is provided with a through-hole, the contact area increases and therefore the ESR can be reduced.

The size of the through-hole is preferably 30 μm to 250 μm in diameter. When the size of the through-hole is within the above range, the ESR can be further reduced.

The density of formed through-holes (the number of formed through-holes) is preferably high and is particularly 50% to 75% of the area of metal foil.

Metal foil has a tension unlike a so-called "metal film" and therefore can be extended out of a unit so as to be connected to an outer electrode.

Furthermore, the metal foil has characteristics different from those of a so-called "metal lead" from the viewpoint of thickness and strength (Young's modulus).

In a solid electrolytic capacitor according to the present invention, no metal foil is preferably present on the uppermost surface or lowermost surface of a multilayer body formed by laminating a plurality of units.

In the solid electrolytic capacitor, when no metal foil is present on the uppermost surface or lowermost surface of the multilayer body, the number of pieces of metal foil can be reduced. Therefore, the solid electrolytic capacitor can be made at low cost.

In a solid electrolytic capacitor according to the present invention, a multilayer body of units is sealed with a coating resin. Material for the coating resin is, for example, an epoxy resin or the like.

In a solid electrolytic capacitor according to the present invention, a valve action metal substrate is provided with an insulating layer which is placed so as to surround the valve action metal substrate for the purpose of isolating an anode section and a cathode section and which is made of an insulating material and is also provided with insulating sections which cover a cathode section-side side surface and cathode section-side end surface of the valve action metal substrate and which are made of the insulating material. A region provided with a solid electrolyte layer is preferably surrounded by the insulating material on a principal surface of the valve action metal substrate.

FIG. 4(a) is a schematic perspective view of an example of a unit with a structure in which a region provided with a solid electrolyte layer is surrounded by an insulating material on a principal surface of a valve action metal substrate. FIG. 4(b) is a sectional view taken along the line A-A of FIG. 4(a).

FIG. 4(a) shows an insulating layer 17 which is placed on a valve action metal substrate 11 included in a unit 50 so as to surround the valve action metal substrate 11 and which is made of an insulating material. An anode section 21 and a cathode section 22 are insulated and isolated by the insulating layer 17.

Cathode section-side side surfaces 11c of the valve action metal substrate 11 are covered by side surface mask sections 18 and a cathode section-side end surface 11b of the valve action metal substrate 11 is covered by an end surface mask section 19.

The side surface mask sections 18 and the end surface mask section 19 are insulating sections.

The insulating layer 17, the side surface mask sections 18, and the end surface mask section 19 are made of the insulating material.

Furthermore, FIG. 4(a) shows a solid electrolyte layer 15 placed on a portion which is located on a principal surface of the valve action metal substrate 11 and which is surrounded by the insulating material.

Referring to FIG. 4(a), the cathode section-side end surface 11b and cathode section-side side surfaces 11c of the valve action metal substrate 11 are sites incapable of being directly viewed and therefore are shown in the form of a layer located behind the end surface mask section 19 and layers located behind the side surface mask sections 18, respectively.

FIG. 4(b) shows the configuration of the unit 50 shown in FIG. 4(a).

FIG. 4(b) explicitly shows that the cathode section-side end surface 11b of the valve action metal substrate 11 is covered by the end surface mask section 19. In the cathode section-side end surface 11b of the valve action metal substrate 11, the end surface mask section 19 covers portions of the front and back principal surfaces of the valve action metal substrate 11 such that the solid electrolyte layer 15 does not warp on the cathode section-side end surface 11b of the valve action metal substrate 11.

In side surfaces of the valve action metal substrate 11, the side surface mask sections 18, which are not shown in the sectional view of FIG. 4(b), cover portions of the front and back principal surfaces of the valve action metal substrate 11 such that the solid electrolyte layer 15 does not warp on the cathode section-side side surfaces 11c of the valve action metal substrate 11.

Manufacturing a solid electrolytic capacitor using units with such a structure enables an LC failure (a failure mode in which the leakage current increases) to be suppressed.

[Method for Manufacturing Solid Electrolytic Capacitor]

A method for manufacturing a solid electrolytic capacitor according to the present invention is described below with reference to FIGS. 5(a), 5(b), 5(c), and 5(d).

Figure 5A:
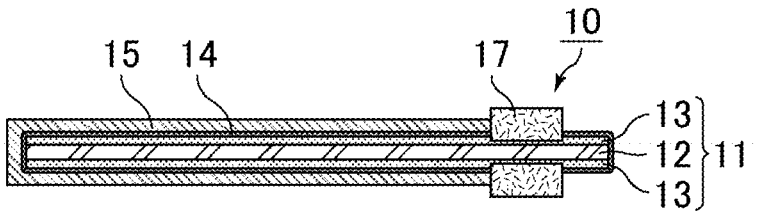

First, each unit 10 shown in FIG. 5(a) is prepared.

At the outset, a valve action metal substrate 11 including a metal core section 12 at the center thereof and porous layers 13, such as etched layers, on surfaces thereof is prepared. The valve action metal substrate 11 includes an anode electrode section that is a section serving as an anode section, a cathode section-forming section that is a section where a cathode section is formed, and an insulating layer-forming section that is a section where an insulating layer isolating the anode section and the cathode section is formed.

Next, a dielectric layer 14 composed of an oxide film is formed on at least a surface of a porous layer on a surface of the cathode section-forming section. The oxide film is formed on the porous layer surface in such a manner that a surface of the valve action metal substrate 11 is subjected to anodic oxidation treatment (also referred to as chemical conversion treatment).

Conversion foil subjected to chemical conversion treatment in advance is preferably used as a valve action metal substrate provided with a dielectric layer formed on a surface of a porous layer.

An insulating layer 17 is formed on a surface of the insulating layer-forming section of the valve action metal substrate 11.

The insulating layer 17 is formed in such a manner that material such as an insulating resin is supplied to a surface of the insulating layer-forming section and is solidified or cured by heating or the like. The insulating layer 17 may be formed before the dielectric layer 14 is formed.

Thereafter, a solid electrolyte layer 15 is provided on the dielectric layer 14. As a solid electrolyte layer, after an inner layer filling pores in a dielectric layer is formed, an outer layer covering the dielectric layer is preferably formed, which is not described in the solid electrolytic capacitor according to the present invention.

A method for forming an inner layer of the solid electrolyte layer 15 is, for example, a method in which impregnating a dielectric layer with a liquid containing a conductive polymer.

Examples of the method for impregnating the dielectric layer with the liquid containing the conductive polymer include a method for impregnating a valve action metal substrate with a conductive polymer solution and a method in which, after a valve action metal substrate is impregnated with a liquid containing a conductive monomer, the conductive polymer is chemically polymerized.

When an outer layer of the solid electrolyte layer is formed, a conductive polymer-blended solution is preferably applied to the dielectric layer. Examples of a method for applying the conductive polymer-blended solution include, but are not limited to, a dipping method, an electrostatic painting method, a spray coating method, a brush coating method, a screen printing method, a gravure printing method, a spin coating method, a drop casting method, and an ink jet printing method.

One including the dielectric layer 14 formed over surfaces of the porous layers 13 of the valve action metal substrate 11 by the above method and the solid electrolyte layer 15 provided on the dielectric layer 14 forms one of the units 10.

Figure 5B:
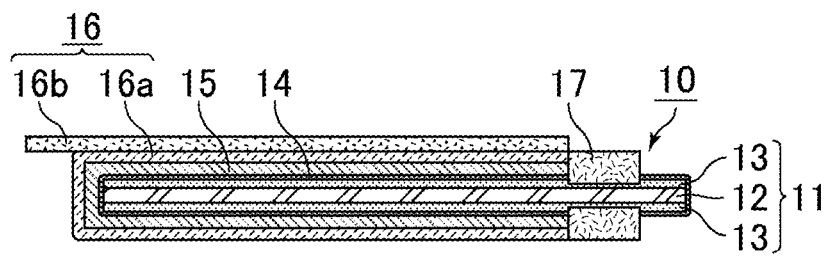

Next, as shown in FIG. 5(b), a carbon layer 16a and metal foil 16b as a conductor layer 16 are provided on the solid electrolyte layer 15.

In the method for manufacturing the solid electrolytic capacitor according to the present invention, a silver layer may be provided instead of the carbon layer or may be provided on the carbon layer in addition to the carbon layer.

Alternatively, metal foil may be provided between the units without providing the carbon layer and the silver layer therebetween when the units are laminated.

The carbon layer and the silver layer can be formed by applying, for example, a carbon paste and silver paste containing a binder.

In the case of providing metal foil, the metal foil is preferably supported in such a state that a layer located under the metal foil is viscous. The undried carbon paste, silver paste, and solid electrolyte layer are viscous and are suitable for directly supporting the metal foil.

In the case where the carbon layer, the silver layer, or the solid electrolyte layer, which is the layer located under the metal foil is dried, the metal foil is unlikely to be joined thereto; hence, it is preferable that a conductive adhesive layer is provided thereon and the metal foil is supported.

Figure 5C:
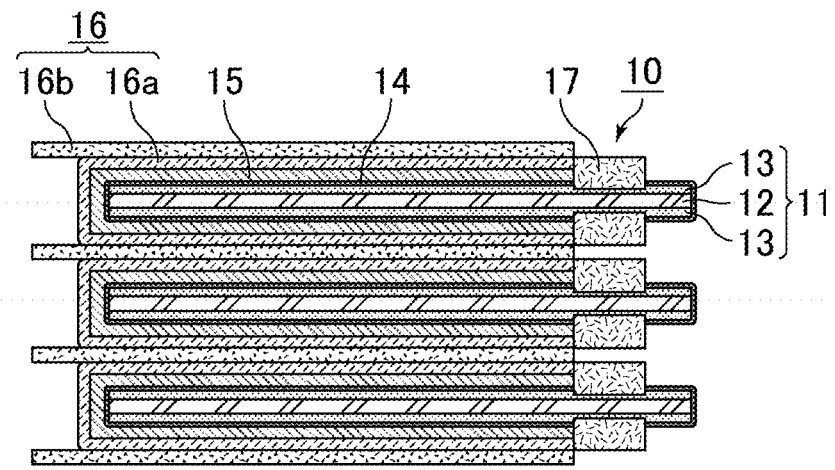

Next, as shown in FIG. 5(c), the units, which each include the conductor layer 16, are laminated.

In lamination, as shown in FIG. 5(b), a plurality of constitutional units are prepared in such a state that the metal foil 16b is supported on the carbon layer 16a and the constitutional units may be laminated. Alternatively, the metal foil 16b is supported on a unit which includes a portion of the conductor layer 16 such as the carbon layer 16a and which includes no metal foil and a unit including a portion of the conductor layer 16 such as the carbon layer 16a is supported thereon.

The units 10 and the metal foil 16b are laminated in this manner such that the conductor layer 16, which includes the metal foil 16b, is present between the neighboring units 10, thereby enabling a multilayer body to be prepared as shown in FIG. 5(c).

FIG. 5(c) shows a state in which the metal foil 16b is separately laminated on the lower side the lowermost unit 10.

Figure 5D:
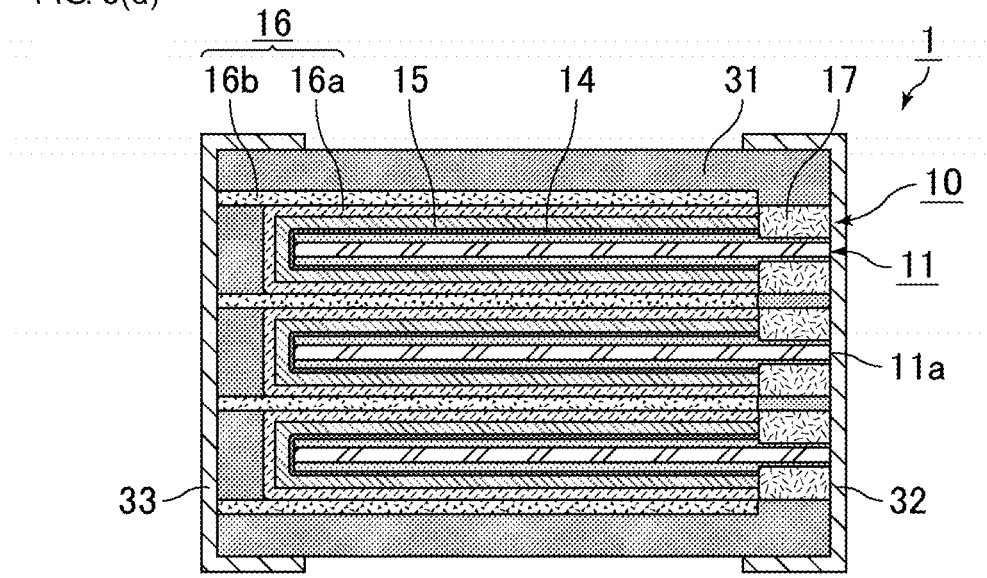

Subsequently, as shown in FIG. 5(d), the multilayer body is sealed with a coating resin 31 such that the coating resin 31 covers the surroundings of side surfaces of the multilayer body. Sealing with the coating resin 31 can be performed by, for example, transfer molding.

Upon sealing with the coating resin 31, on the side that the metal foil 16b is exposed, the metal foil 16b is set to be exposed regardless of whether a layer of the coating resin 31 is formed.

In an end surface opposite to an end surface in which the metal foil 16b is exposed, an anode section-side end surface 11a of the valve action metal substrate 11 is set to protrude from the insulating layer 17 or is set to be exposed.

After sealing is performed, the anode section-side end surface 11a of the valve action metal substrate 11 or the metal foil 16b may be exposed by polishing an end surface or the like.

The metal foil 16b protruding from an end surface of each unit 10 and the anode section of the valve action metal substrate 11 that protrudes from the end surface thereof are cut as required, whereby the metal foil 16b and the anode section-side end surface 11a of the valve action metal substrate 11 are exposed from an end surface of the multilayer body. A cathode outer electrode 33 and an anode outer electrode 32 are formed on both end surfaces of the multilayer body, whereby a solid electrolytic capacitor 1 is obtained.

The cathode outer electrode and the anode outer electrode can be formed by a plating method. Plating layers used may be Zn—Ni—Au plating layers, Ni—Au plating layers, Zn—Ni—Cu plating layers, Ni—Cu plating layers, and the like. A Ni plating layer, a Sn plating layer, or a Cu plating layer is preferably further formed on these plating layers.

EXAMPLES

Examples in which a solid electrolytic capacitor according to the present invention is disclosed in detail are described below. The present invention is not limited to the examples only.

Example 1

First, aluminum conversion foil including etched layers on surfaces was prepared as a valve action metal substrate. A dielectric layer composed of an oxide film was provided so as to cover the aluminum conversion foil.

In particular, a surface of the aluminum conversion foil was immersed in an aqueous solution of ammonium adipate and a voltage was applied thereto, whereby the dielectric layer was formed over the etched layers on the surfaces of the aluminum conversion foil.

Next, in order to prevent short-circuiting between an anode section and a cathode section, a strip-like insulating layer was formed at a position apart from a longitudinal end of the aluminum conversion foil at a predetermined distance so as to surround the aluminum conversion foil.

Thereafter, large-area portions (etched layers) of the aluminum conversion foil that were divided by the insulating layer were impregnated with a conductive polymer solution, whereby an inner layer of a solid electrolyte layer was formed. The conductive polymer solution for the inner layer was commercially available PEDOT:PSS (Orgacon HIL- 1005 produced by Sigma-Aldrich Corporation) pulverized with an ultrasonic homogenizer.

Subsequently, the whole of the valve action metal substrate having the dielectric layer was immersed in a conductive polymer-blended solution, whereby an outer layer of the solid electrolyte layer was formed and the solid electrolyte layer was provided on the dielectric layer. The conductive polymer-blended solution for the outer layer was a blended solution containing commercially available PEDOT:PSS (Orgacon HIL-1005 produced by Sigma-Aldrich Corporation). In the conductive polymer-blended solution, a dispersion medium used was water and a high-boiling point solvent used was DMSO.

A surface of the solid electrolyte layer was dipped in a carbon paste, whereby a carbon layer was formed. A predetermined number of units each including the carbon layer obtained as described above were laminated in such a manner that metal foil is interposed between the units, whereby a multilayer body was prepared. The metal foil used was aluminum foil, coated with carbon, having a thickness of µm.

A portion of the valve action metal substrate was cut such that an anode section-side end surface of the valve action metal substrate did not protrude from an anode section-side end portion of the insulating layer and was exposed from the insulating layer.

Incidentally, metal foil was provided on each of the lowermost surface and uppermost surface of the multilayer body.

Thereafter, the multilayer body was sealed with an epoxy resin. Next, an anode outer electrode was formed so as to be connected to the anode section-side end surface of the valve action metal substrate that was exposed from the insulating layer and a cathode outer electrode was formed so as to be connected to the metal foil, whereby the manufacture of a solid electrolytic capacitor was finished.

Comparative Example 1

In substantially the same manner as that used in Example 1, a dielectric layer was formed over surfaces of porous layers of a valve action metal substrate and an insulating layer and a solid electrolyte layer were subsequently provided thereon. Thereafter, a surface of the solid electrolyte layer was dipped in a carbon paste, followed by drying, whereby a carbon layer was formed. A surface of the obtained carbon layer was dipped in a silver paste, followed by drying, whereby a silver layer was formed and a solid electrolytic capacitor element was obtained.

A predetermined number of solid electrolytic capacitor elements obtained as described above were stacked, were joined using a conductive adhesive (H9480 produced by NAMIX), and were then sealed with a coating resin.

Thereafter, an exposed portion of an anode section-side end surface of the valve action metal substrate was connected to an outer electrode terminal by resistance welding.

For a cathode layer, a cathode outer electrode for extension was provided on the lowermost surface of a multilayer body and a silver layer located on the lowermost surface of the multilayer body was electrically connected to the cathode outer electrode using a conductive adhesive.

In Example 1 and Comparative Example 1, solid electrolytic capacitors were manufactured by varying the number of the laminated units or solid electrolytic capacitor elements from one up to eight and were measured for equivalent series resistance (ESR) at 100 kHz using an LCR meter.

Ten solid electrolytic capacitors were manufactured for each type and were measured and each of the measurements was an average from ten solid electrolytic capacitors.

FIG. 6 is a graph showing the relationship between the number of laminated units or solid electrolytic capacitor elements in each of the solid electrolytic capacitors according to Example 1 and Comparative Example 1 and the ESR.

As shown in FIG. 6, in Example 1, increasing the number of the laminated units reduces the ESR. It is clear that the ESR can be reduced by directly connecting metal foil to a cathode outer electrode using metal foil.

However, in the solid electrolytic capacitors according to Comparative Example 1, increasing the number of the laminated solid electrolytic capacitor elements to three or more hardly changes the ESR.

Example 2

Eight types of solid electrolytic capacitors were manufactured in substantially the same manner as that used in Example 1 except that eight types of metal foil different in thickness were used and the number of laminated units was two. The solid electrolytic capacitors were measured for equivalent series resistance (ESR) at 100 kHz in substantially the same manner as that used in Example 1. The results are shown in Table 1.

Ten solid electrolytic capacitors were manufactured for each type and were measured and each of the measurements was an average from ten solid electrolytic capacitors.

TABLE 1

| | Thickness of metal foil (µm) | | | | | | | |
|---|---|---|---|---|---|---|---|---|
| | 5 | 6 | 7 | 22 | 30 | 50 | 75 | 100 |
| ESR (mΩ) | 90 | 32 | 31 | 30 | 29 | 29 | 28 | 27 |

As is clear from the results in Table 1, the ESR is low when the thickness of metal foil is within the range of 6 µm to 100 µm.

Example 3

Five types of solid electrolytic capacitors were manufactured in substantially the same manner as that used in Example 1 except that metal foil made of five types of material different in resistance was used and the number of laminated units was two. The solid electrolytic capacitors were measured for equivalent series resistance (ESR) at 100 kHz in substantially the same manner as that used in Example 1. Incidentally, material that is metal foil with a resistance of 5 mΩ or 10 mΩ is etched aluminum foil and material that is metal foil with a resistance of 34 mΩ, 35 mΩ, or 37 mΩ is unetched aluminum foil. The results are shown in Table 2.

Ten solid electrolytic capacitors were manufactured for each type and were measured and each of the measurements was an average from ten solid electrolytic capacitors.

TABLE 2

| Resistance of metal foil (mΩ) | 5 | 10 | 34 | 35 | 37 |
|---|---|---|---|---|---|
| ESR (mΩ) | 29 | 30 | 31 | 250 | 260 |

As is clear from the results in Table 2, the ESR is low when the resistance of metal foil is within the range of 5 mΩ to 34 mΩ.

Example 4

Six types of solid electrolytic capacitors were manufactured in substantially the same manner as that used in Example 1 except that six types of metal foil varied in surface roughness or the like so as to give different contact resistances with a carbon layer were used and the number of laminated units was two. The solid electrolytic capacitors were measured for equivalent series resistance (ESR) at 100 kHz in substantially the same manner as that used in Example 1. The results are shown in Table 3.

Ten solid electrolytic capacitors were manufactured for each type and were measured and each of the measurements was an average from ten solid electrolytic capacitors.

The contact resistance was measured using measurement samples that were prepared in such a manner that carbon layers were formed by applying a carbon paste containing a binder to epoxy resin substrates provided with an electrode land pattern and pieces of metal foil different in surface roughness were attached to the carbon layers, followed by curing. The resistance between carbon and metal foil was measured with a four-terminal direct-current resistance meter, whereby the contact resistance between the metal foil and the carbon layer was measured.

TABLE 3

| Contact resistance of metal foil (mΩ) | | | | | |
|---|---|---|---|---|---|
| 5 | 21 | 34 | 152 | 351 | 368 |
| ESR (mΩ) 29 | 30 | 31 | 71 | 82 | 804 |

As is clear from the results in Table 3, the ESR is low when the contact resistance of metal foil with a carbon layer is within the range of 5 mΩ to 351 mΩ.

Example 5

The influence of etching treatment on metal foil was evaluated using two types of metal foil: metal foil not subjected to surface etching treatment (roughening treatment) and metal foil subjected to surface etching treatment.

The symbol b-1 shown in Table 4 represents a lamination of two layers in total with unetched aluminum foil interposed between units, each of the units being one obtained by providing a silver layer on a carbon layer of a unit, obtained in Example 1, having the carbon layer.

The symbol b-2 represents a lamination of two layers in total with etched aluminum foil interposed between units in the symbol b-1.

The symbol c-1 shown in Table 4 represents a lamination of two layers in total with unetched aluminum foil interposed between units, each of the units being a unit provided with a solid electrolyte layer formed in Example 1 and no carbon layer.

The symbol c-2 represents a lamination of two layers in total with etched aluminum foil interposed between units in the symbol c-1.

The equivalent series resistance (ESR) was measured at 100 kHz in substantially the same manner as that used in Example 1. The results are shown in Table 4.

Ten solid electrolytic capacitors were manufactured for each type and were measured and each of the measurements was an average from ten solid electrolytic capacitors.

Table 4 shows various characteristics of obtained solid electrolytic capacitors and the ESR thereof.

Incidentally, Cap. represents the capacitance, df represents the dielectric loss tangent, and L. C. represents the leakage current.

TABLE 4

| | Cap. (μF) | df | ESR (mΩ/100 kHz) | L. C. (μA/2 min) |
|---|---|---|---|---|
| b-1 | 3.71 | 1.094 | 789 | −0.03 |
| b-2 | 3.61 | 0.965 | 214 | 0.03 |
| c-1 | 3.70 | 17.937 | 57,092 | 20.82 |
| c-2 | 3.89 | 3.962 | 3,280 | 3.31 |

As is clear from Table 4, roughening treatment reduces the ESR and also reduces the dielectric loss tangent.

Example 6

Five types of solid electrolytic capacitors were manufactured in substantially the same manner as that used in Example 1 except that five pieces of metal foil varied in surface roughness were used and the number of laminated units was two. The solid electrolytic capacitors were measured for equivalent series resistance (ESR) at 100 kHz in substantially the same manner as that used in Example 1. The results are shown in Table 5.

Ten solid electrolytic capacitors were manufactured for each type and were measured and each of the measurements was an average from ten solid electrolytic capacitors.

TABLE 5

| Surface roughness Ra (nm) | 26 | 30 | 325 | 1,002 | 1,208 |
|---|---|---|---|---|---|
| ESR (mΩ) | 58 | 30 | 29 | 28 | 102 |

As is clear from the results in Table 5, the ESR is low when the Ra of metal foil is within the range of 30 nm to 1,002 nm.

Example 7

Insulating layers made of an insulating material were formed on cathode section-side side surfaces and a cathode section-side end surface of a valve action metal substrate, units were prepared so as to have a structure in which a region provided with a solid electrolyte layer was surrounded by an insulating material on a principal surface of the valve action metal substrate, and a multilayer body was prepared in substantially the same manner as that used in Example 1, whereby a solid electrolytic capacitor was manufactured.

Measurement results of the leakage current of the solid electrolytic capacitor (four-sided mask structure) were shown in FIG. 7.

For comparison, results of a structure (one-sided mask structure) having only an insulating layer, made of an insulating material, placed for the purpose of isolating an anode section and a cathode section were also shown in FIG. 7.

The leakage current was a value obtained two minutes after the application of a voltage.

In FIG. 7, for ten solid electrolytic capacitors, the value of the leakage current is plotted upward in ascending order. The LC value plotted at the uppermost position (a cumulative frequency of 100%) is the maximum value of the leakage current of a solid electrolytic capacitor.

From the results, it is clear that a four-sided mask structure can suppress an LC failure.

Example 8

Five types of solid electrolytic capacitors were manufactured in substantially the same manner as that used in Example 1 except that metal foil provided with through-holes with diameters of 11 µm, 30 µm, 99 µm, 250 µm, and 301 µm was used and the number of laminated units was two. The solid electrolytic capacitors were measured for equivalent series resistance (ESR) at 100 kHz in substantially the same manner as that used in Example 1. The results are shown in Table 6.

Ten solid electrolytic capacitors were manufactured for each type and were measured and each of the measurements was an average from ten solid electrolytic capacitors.

TABLE 6

| Diameter of through-hole (µm) | 11 | 30 | 99 | 250 | 301 |
|---|---|---|---|---|---|
| ESR (mΩ) | 81 | 37 | 29 | 38 | 102 |

As is clear from the results in Table 6, the ESR is low when the diameter of the through-holes formed in the metal foil is within the range of 30 µm to 250 µm.

REFERENCE SIGNS LIST 1, 1', 2 Solid electrolytic capacitor
10, 40, 50 Unit
10b, 40b Cathode section-side end surface of unit
11 Valve action metal substrate
11a Anode section-side end surface of valve action metal substrate
11b Cathode section-side end surface of valve action metal substrate
11c Cathode section-side side surfaces of valve action metal substrate
12 Metal core section
13 Porous layers
14 Dielectric layer
15 Solid electrolyte layer
16 Conductor layer
16a Carbon layer (conductor layer)
16b Metal foil (conductor layer)
$16b_1$ Metal foil
$16b_2$ Carbon coat
$16b_3$ Metal foil coated with carbon
17 Insulating layer
18 Side surface mask sections (insulating sections)
19 End surface mask section (insulating section)
21 Anode section
22 Cathode section
31 Coating resin
32 Anode outer electrode
33 Cathode outer electrode

The invention claimed is:

1. A solid electrolytic capacitor comprising:
a plurality of laminated units, each unit of the plurality of laminated units including:
a valve action metal substrate including a porous layer on a surface thereof, the valve action metal substrate having an anode section-side end surface;
a dielectric layer on a surface of the porous layer;
a solid electrolyte layer on the dielectric layer; and
a carbon layer on the solid electrolyte layer;
a metal foil between the laminated units, wherein the metal foil has a surface coated with carbon and the carbon-coated surface of the metal foil is in direct contact with the carbon layer;
a coating resin sealing the plurality of laminated units and the metal foil;
an anode outer electrode on a surface of the coating resin and directly connected to the anode section-side end surface of the valve action metal substrate; and
a cathode outer electrode on the surface of the coating resin and directly connected to the metal foil.

2. The solid electrolytic capacitor according to claim 1, wherein a contact resistance between the metal foil and the carbon layer is less than a contact resistance between the carbon layer and the solid electrolyte layer.

3. The solid electrolytic capacitor according to claim 2, wherein the contact resistance between the metal foil and the carbon layer is 5 mΩ to 351 mΩ.

4. The solid electrolytic capacitor according to claim 1, wherein the metal foil has a roughened surface.

5. The solid electrolytic capacitor according to claim 1, further comprising a coat layer made of an anchor coat agent on a surface of the metal foil.

6. The solid electrolytic capacitor according to claim 4, wherein a surface roughness Ra of the metal foil is 30 nm to 1,002 nm.

7. The solid electrolytic capacitor according to claim 5, wherein a surface roughness Ra of the metal foil is 30 nm to 1,002 nm.

8. The solid electrolytic capacitor according to claim 1, wherein the metal foil has a thickness of 6 µm to 100 µm.

9. The solid electrolytic capacitor according to claim 1, wherein the metal foil has a through-thickness resistance of 5 mΩ to 34 mΩ.

10. The solid electrolytic capacitor according to claim 1, wherein the metal foil is made of at least one metal selected from aluminum, copper, and silver.

11. The solid electrolytic capacitor according to claim 1, wherein the metal foil includes at least one through-hole.

12. The solid electrolytic capacitor according to claim 1, further comprising an insulating layer surrounding the valve action metal substrate so as to isolate an anode section and a cathode section of the valve action metal substrate.

* * * * *